(12) United States Patent
Takase et al.

(10) Patent No.: US 12,131,120 B2
(45) Date of Patent: Oct. 29, 2024

(54) WORD CODING DEVICE, ANALYSIS DEVICE, LANGUAGE MODEL LEARNING DEVICE, METHOD, AND PROGRAM

(71) Applicant: NIPPON TELEGRAPH AND TELEPHONE CORPORATION, Tokyo (JP)

(72) Inventors: Sho Takase, Tokyo (JP); Masaaki Nagata, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 539 days.

(21) Appl. No.: 17/269,665

(22) PCT Filed: Aug. 22, 2019

(86) PCT No.: PCT/JP2019/032854
§ 371 (c)(1),
(2) Date: Feb. 19, 2021

(87) PCT Pub. No.: WO2020/040255
PCT Pub. Date: Feb. 27, 2020

(65) Prior Publication Data
US 2021/0342529 A1  Nov. 4, 2021

(30) Foreign Application Priority Data

Aug. 24, 2018  (JP) ................. 2018-157473

(51) Int. Cl.
*G06F 40/20* (2020.01)
*G06N 3/04* (2023.01)
*G06N 3/08* (2023.01)

(52) U.S. Cl.
CPC ............... *G06F 40/20* (2020.01); *G06N 3/04* (2013.01); *G06N 3/08* (2013.01)

(58) Field of Classification Search
None
See application file for complete search history.

(56) References Cited

U.S. PATENT DOCUMENTS

2018/0075343 A1  3/2018  van den Oord et al.
2018/0203848 A1  7/2018  Perez et al.
(Continued)

FOREIGN PATENT DOCUMENTS

WO  2018081089 A1  5/2018

OTHER PUBLICATIONS

Verwimp et al. (2017) "Character-Word LSTM Language Models," 15th Conference of the European Chapter of the Association for Computational Linguistics (EACL2017), pp. 417-427.
(Continued)

*Primary Examiner* — Quynh H Nguyen

(57) ABSTRACT

To generate a vector representing a word in consideration of the importance of the character string of the word. A character N-gram vector acquisition unit acquires a vector representing each of character N-grams included in a word. A weight calculation unit 40 calculates a weight for a vector representing each of the character N-grams on the basis of the vector representing each of the character N-grams included in the word, and a character N-gram vector combining unit 42 generates a composite vector obtained by combining the vector representing each of the character N-grams on the basis of the vector representing each of the character N-grams included in the word and the weight for the vector representing each of the character N-grams.

20 Claims, 10 Drawing Sheets

(56) References Cited

U.S. PATENT DOCUMENTS

2020/0257764 A1   8/2020   Reisswig et al.
2022/0229982 A1   7/2022   Morishita et al.

OTHER PUBLICATIONS

Shindo et al. (2015) "Analysis of Compound Word Expressions using Convolutional Neural Networks," Information Processing Society of Japan Research Report Natural Language Processing (NL).
Sennrich et al. (2016) "Neural Machine Translation of Rare Words with Subword Units," Proceedings of the 54th Annual Meeting of the Association for Computational Linguistics, Aug. 7-12, 2016, Berlin, Germany, pp. 1715-1725.
Bahdanau et al. (2015) "Neural Machine Translation by Jointly Learning to Align and Translate," in Proceedings of ICLR.
Luong et al. (2015) "Effective Approaches to Attention-based Neural Machine Translation," in Proceedings of EMNLP.
Morishita et al. (2018) "Improving Neural Machine Translation by Incorporating Hierarchical Subword Features" Proceedings of the 27th International Conference on Computational Linguistics (COLING), Aug. 20-26, 2018, Santa Fe, New Mexico, USA, pp. 618-629.
Suzuki et al. (2018) "An Empirical Study of Building a Strong Baseline for Constituency Parsing" The 56th Annual Meeting of the Association for Computational Linguistics, Jul. 15-20, 2018, Melbourne, Australia, pp. 612-618.
Morishita et al. "Improving neural machine translation by Incorporating Hierarchical Subword Features," Proceeding of the 32nd Annual Conference of JSAI DVD [DVD-ROM], Feb. 19, 2021.

WORD CODING DEVICE, ANALYSIS DEVICE, LANGUAGE MODEL LEARNING DEVICE, METHOD, AND PROGRAM

CROSS-REFERENCE TO RELATED APPLICATIONS

This application is a U.S. 371 Application of International Patent Application No. PCT/JP2019/032854, filed on 22 Aug. 2019, which application claims priority to and the benefit of JP Application No. 2018-157473, filed on 24 Aug. 2018, the disclosures of which are hereby incorporated herein by reference in their entireties.

TECHNICAL FIELD

The present invention relates to a word coding device, an analysis device, a language model learning device, a method, and a program, and particularly to a word coding device, an analysis device, a language model learning device, a method, and a program for generating a vector representing a word.

BACKGROUND ART

In order for a computer to translate or summarize documents written in natural languages, there is a need for a technique for generating sentences by a computer as well as analysis of natural language sentences. In addition, interaction between a machine and a person requires automatic generation of natural language sentences.

Generation of sentences by a computer is performed by repeating a process in which a first word is input, then the probability of a word that appears next is calculated to generate a word, and then, with an output word as an input, the probability of a word that appears next is calculated.

In recent years, a method of calculating the probability of appearance of a word on the basis of the whole word sequence of the past by using recurrent neural networks (RNNs) has become the mainstream. In this method, words are represented as fixed-length vectors whose each dimensional element is a real number, and combinations between words are represented by vector-to-vector operations.

In addition, a method is known in which when generating a vector representing a word, the embedding vector of the characters is coupled to the embedding vector of the word (Non Patent Literature (NPL) 1).

CITATION LIST

Non Patent Literature

NPL 1: Lyan Verwimp, Joris Pelemans, Hugo Van hamme, and Patrick Wambacq. 2017. Character-word 1 stm language models. In Proceedings of the 15th Conference of the European Chapter of the Association for Computational Linguistics (EACL 2017), pages 417-427.

SUMMARY OF THE INVENTION

Technical Problem

In the technique disclosed in NPL 1, the importance of the character string constituting the word is not taken into consideration in construction of the word embedding vector.

To solve the problems, an object of the present invention is to provide a word coding device, a method, and a program that can generate a vector representing a word in consideration of the importance of the character string of the word.

In addition, an object of the present invention is to provide an analysis device and a program that can accurately analyzing a text.

In addition, an object of the present invention is to provide a language model learning device and a program that can learn a language model for accurately analyzing a text.

Means for Solving the Problem

To achieve the above object, a word coding device according to the present invention includes a word coding unit configured to convert an entered word into a composite vector by using a pre-learned neural network, wherein the entered word includes character N-grams, the word coding unit includes a character N-gram vector acquisition unit configured to acquire a predetermined vector representing each of the character N-grams included in the entered word, a weight calculation unit configured to calculate a weight for the predetermined vector representing each of the character N-grams on a basis of the predetermined vector representing each of the character N-grams included in the entered word; and a character N-gram vector combining unit configured to generate a composite vector obtained by combining the predetermined vector representing each of the character N-grams on a basis of the predetermined vector representing each of the character N-grams included in the entered word and the weight for the predetermined vector representing each of the character N-grams.

A word coding method according to the present invention is a method in which a word coding unit converts an entered word into a composite vector by using a pre-learned neural network, the entered word including character N-grams, the method including converting at the word coding unit, wherein a character N-gram vector acquisition unit acquires a predetermined vector representing each of the character N-grams included in a word, a weight calculation unit calculates a weight for a vector representing each of the character N-grams on a basis of the predetermined vector representing each of the character N-grams included in the word, and a character N-gram vector combining unit generates a composite vector obtained by combining the predetermined vector representing each of the character N-grams on a basis of the predetermined vector representing each of the character N-grams included in the word and the weight for the predetermined vector representing each of the character N-grams.

An analysis device according to the present invention includes an analysis unit configured to output a prediction result of an output text for a predetermined purpose for an entered text by using a pre-learned neural network, wherein the entered text includes words, the analysis unit includes a word coding unit configured to convert each word included in the entered text into a composite word vector or a composite vector, a sequence coding unit configured to calculate, in order from a first word of the entered text, a hidden vector for a t-th word by using a hidden vector calculated for a (t-1)-th word and a composite word vector or a composite vector output for the t-th word from the word coding unit, and a sequence decoding unit configured to generate a prediction result of the output text from the hidden vector calculated for each word included in the entered text, each word includes character N-grams, and the word coding unit includes a character N-gram vector acquisition unit configured to acquire, for each word included in the entered text, a vector representing each of the character N-grams included in the word, a weight calculation unit configured to calculate a weight for a predetermined vector representing each of the character N-grams on a basis of the predetermined vector representing each of the character N-grams included in the word, a character N-gram vector combining unit configured to generate a composite vector obtained by combining the predetermined vector representing each of the character N-grams on a basis of the predetermined vector representing each of the character N-grams included in the word and the weight for the predetermined vector representing each of the character N-grams, a word vector acquisition unit configured to acquire a vector representing the word; and a word vector combining unit configured to generate a composite word vector obtained by combining the vector representing the word and the composite vector generated by the character N-gram vector combining unit.

A language model learning device according to the present invention includes the analysis device described above, and a parameter learning unit configured to learn a predetermined vector representing the character N-grams, a parameter used in calculation of the weight, a vector representing the word, and a parameter of each of the sequence coding unit and the sequence decoding unit on a basis of the prediction result of the output text by the analysis device for a learning text and a correct answer of the output text for the learning text.

A program according to the present invention is a program for causing a computer to function as each unit of the word coding device, the analysis device or the language model learning device described above.

Effects of the Invention

With the word coding device, the method, and the program of the present invention, it is possible to generate a vector representing a word in consideration of the importance of the character string of the word by calculating a weight for a predetermined vector representing each of the character N-grams included in the word, and generating a composite vector obtained by combining the predetermined vector representing each of the character N-grams.

With the analysis device and the program of the present invention, it is possible to accurately analyze a text through prediction of the next word by calculating a weight for a predetermined vector representing each of the character N-grams included in a word, generating a composite vector obtained by combining the predetermined vector representing each of the character N-grams, and generating a composite word vector combined with a vector representing the word.

With the language model learning device and the program of the present invention, it is possible to learn a language model for accurately analyzing a text by calculating a weight for a predetermined vector representing each of the character N-grams included in a word, generating a composite vector obtained by combining the predetermined vector representing each of the character N-grams, and generating a composite word vector combined with a vector representing the word.

DESCRIPTION OF EMBODIMENTS

Embodiments of the present invention will be described with reference to the drawings.

Overview of Word Coding Device According to Embodiments of Present Invention In embodiments of the present invention, for an embedding vector of a character N-gram of a word, a weight is applied to each dimension of the embedding vector of the character N-gram unlike the method of the technique described in NPL 1 that uses embedding vectors of characters.

Specifically, for a word as an input, a word coding unit using a neural network performs a conversion to a word vector. Then, vectorization and weighting are performed for each character N-gram with a pre-learned parameter.

In this manner, a weight is given to each dimension of the embedding vector of the character N-gram considering the importance of the character string constituting the word during construction of the word embedding vector, and thus the word embedding vector can be calculated in consideration of the meaning of each character N-gram.

First Embodiment

Figure 1:
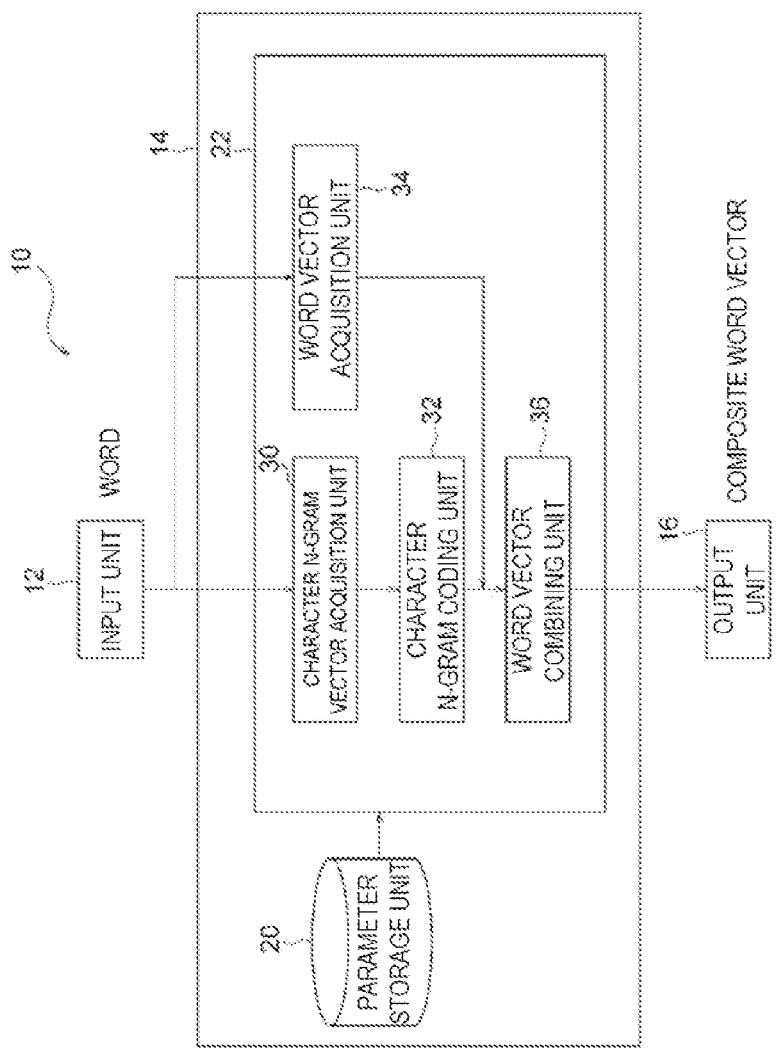
FIG. 1 is a schematic diagram illustrating an example of a configuration of a word coding device according to a first embodiment of the present invention.

Configuration of Word Coding Device According to First Embodiment of Present Invention A word coding device according to a first embodiment of the present invention will be described. FIG. 1 is a schematic diagram illustrating a configuration of the word coding device according to the embodiment of the present invention.

A word coding device 10 according to the first embodiment of the present invention includes an input unit 12, a computation unit 14, and an output unit 16.

The input unit 12 accepts each word included in a text as an input.

The computation unit 14 is composed of a computer including a CPU, a RAM, and a ROM storing a program for executing a word coding process routine described later, and is functionally configured as follows. The computation unit 14 includes a parameter storage unit 20 and a word coding unit 22.

The parameter storage unit 20 stores parameters used in the process of each of a character N-gram vector acquisition unit 30, a character N-gram coding unit 32, a word vector acquisition unit 34, and a word vector combining unit 36.

For each word included in an entered text as a coding target, the word coding unit 22 generates a composite word vector representing a word using a pre-learned neural network, which is output by the output unit 16.

The word coding unit 22 includes the character N-gram vector acquisition unit 30, the character N-gram coding unit 32, the word vector acquisition unit 34, and the word vector combining unit 36.

The character N-gram vector acquisition unit 30 acquires an embedding vector representing each of the character N-grams included in a coding target word.

Specifically, a sequence of word $x_t$ included in an entered text is accepted. Note that $t=1, \ldots, T$ holds, where T is the number of words that constitute the text. The sequence of word $x_t$ is obtained by dividing a text in a given unit, and in the present embodiment, a text divided in advance into words is the input. In addition, N is an integer of 2 or greater, and accordingly a bigram corresponds to N=2, for example.

Then the word is divided into character N-grams, and for the 1-hot vector (a vector with 1 for the element corresponding to the character N-grams, and 0 for other elements) $q_1, \ldots, q_M$ representing each character N-gram, the sequence of the embedding vector is obtained using a transformation matrix C (which is a matrix of the number of character N-grams in a corpus×the number of dimensions of the embedding vectors, and it is assumed that the value of each element of the matrix has been obtained in advance through a learning process), and, an embedding vector sequence S of the character N-gram is output. S is expressed as $S=[s_1, \ldots, s_M]$. M is the number of character N-grams included in a word. For example, when the word is "cat" and N=2, the character N-grams are "ˆc", "ca", "at" and "tˆ", and accordingly M=4 holds. Each $S_1$ is the embedding vector of the character N-gram.

Figure 2:
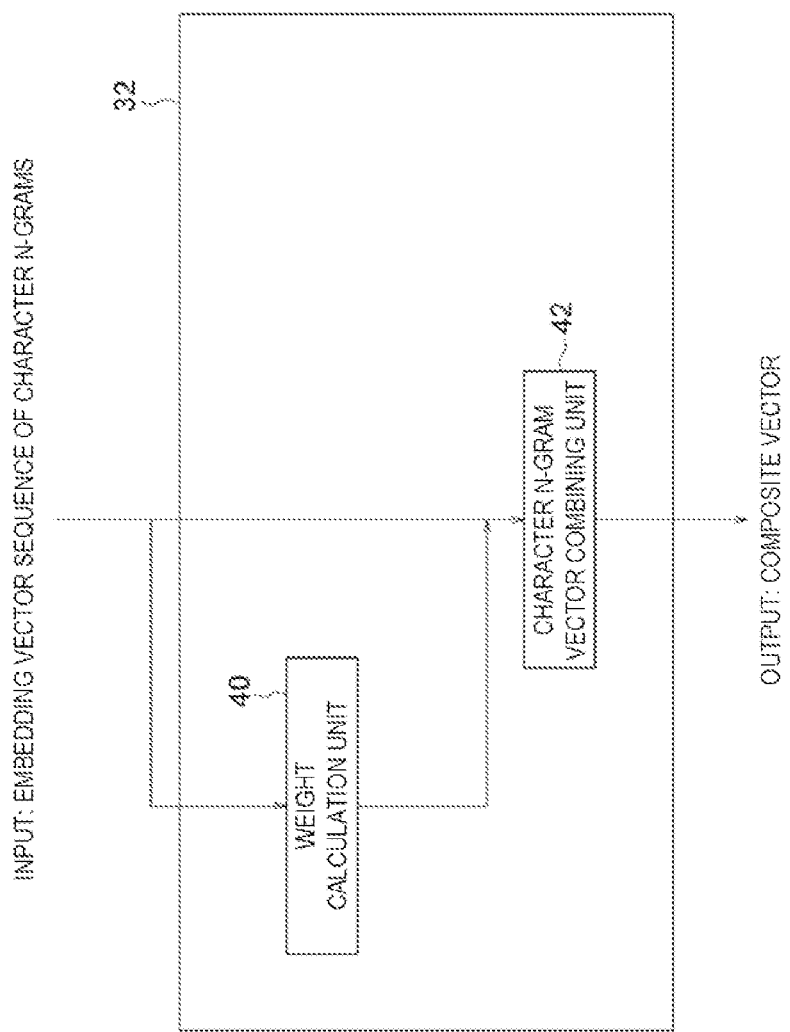
FIG. 2 is a schematic diagram illustrating an example of a configuration of a character N-gram coding unit of the word coding device according to the first embodiment of the present invention.

With the embedding vector sequence S of character N-grams as an input, the character N-gram coding unit 32 outputs an embedding vector $c_t$ of the word composed of the character N-grams. As illustrated in FIG. 2, the character N-gram coding unit 32 includes a weight calculation unit 40 and a word N-gram vector combining unit 42.

The weight calculation unit 40 calculates a weight for the embedding vector representing each character N-gram on the basis of the embedding vector representing each character N-gram included in the word.

Figure 3:
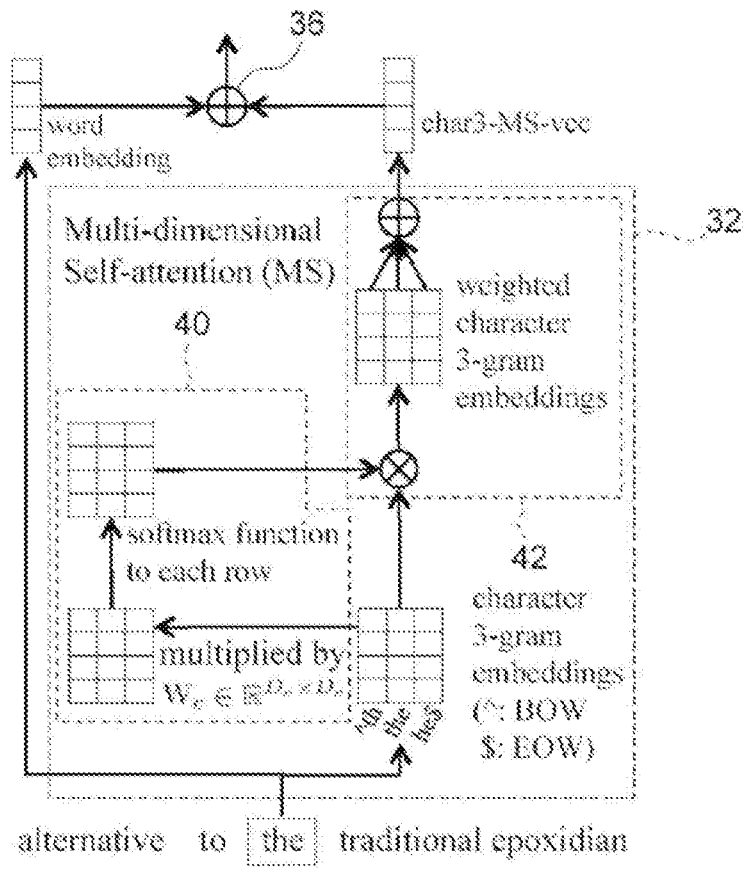
FIG. 3 is a diagram for describing an overview of a process of the word coding device according to the first embodiment of the present invention.

Specifically, a weight vector $g_i$ for the embedding vector representing the i-th character N-gram is calculated according to the following equation (see FIG. 3).

$$\{g_i\}_j = \{\text{softmax}([W_c S]_j^T)\}_i, \qquad [\text{Math. 1}]$$

Where $$W_c \in \mathbb{R}^{D_e \times D_e}$$

is a pre-learned weight matrix, and $D_e$ represents the number of dimensions of the embedding vector. In addition, $[\ ]_j$ represents an operation of taking out the j-th column of the matrix, and $\{\ \}_j$ represents an operation of taking out the j-th element of the vector.

The word N-gram vector combining unit 42 generates a composite vector obtained by combining the embedding vector representing each of the character N-grams on the basis of the embedding vector representing each of the character N-grams included in the word and the weight for the embedding vector representing each of the character N-grams.

Specifically, a composite vector $c_t$ is generated according to the following equation (see FIG. 3).

$$c_t = \sum_{i=1}^{I} g_i \odot s_i, \qquad [\text{Math. 2}]$$

Where $\odot$ represents an element product of the vector.

The word vector acquisition unit 34 acquires an embedding vector representing the word. Specifically, with a 1-hot vector $x_t$ representing the word as an input, an embedding vector $e_t$ of the word is determined according to the following equation.

$$e_t = E x_t, \qquad [\text{Math. 3}]$$

Where $$E \in \mathbb{R}^{D_e \times V}$$

is a pre-learned word embedding matrix, and V is the number of vocabularies.

The word vector combining unit 36 generates a composite word vector obtained by combining the embedding vector representing the word and the composite vector generated by the character N-gram vector combining unit 42.

Specifically, with the word embedding vector $e_t$ and the composite vector $c_t$ as an input, and a composite word vector $e_t'$ is determined according to the following equation (see FIG. 3).

$$e_t' = e_t + c_t \qquad [\text{Math. 4}]$$

Figure 4:
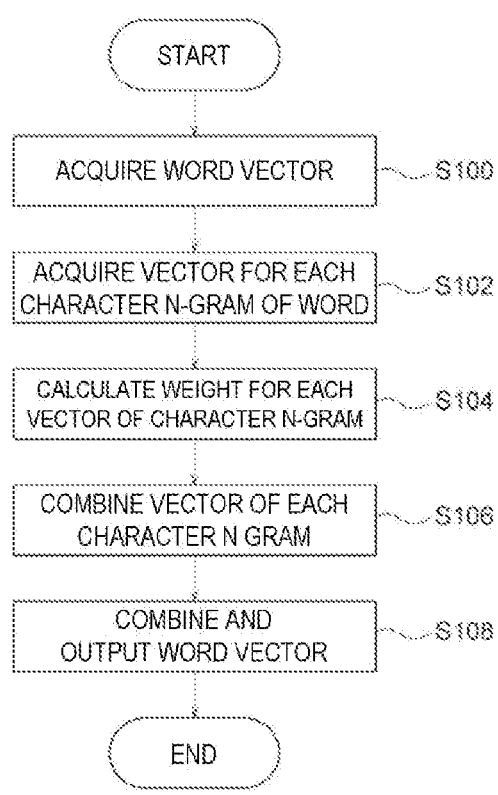
FIG. 4 is a flowchart illustrating a word coding process routine of the word coding device according to the first embodiment of the present invention.

Operation of Word Coding Device According to First Embodiment of Present Invention FIG. 4 is a flowchart illustrating a word coding process routine according to the first embodiment of the present invention.

When each word included in the text is entered to the input unit 12, the word coding process routine illustrated in FIG. 4 is repeatedly executed on each word in the word coding device 10.

First, at step S100, the word vector acquisition unit 34 acquires the embedding vector representing the word.

At step S102, the character N-gram vector acquisition unit 30 acquires the embedding vector representing each of the character N-grams included in the processing target word.

At step S104, the character N-gram coding unit 32 calculates the weight for the embedding vector representing each of the character N-grams on the basis of the embedding vector sequence S of the character N-grams.

At step S106, the word N-gram vector combining unit 42 generates a composite vector obtained by combining the embedding vector representing the character N-gram on the basis of the embedding vector representing each of the character N-grams included in the word and the weight for the embedding vector representing each of the character N-grams.

Then, at step S108, the word vector combining unit 36 generates a composite word vector obtained by combining the embedding vector representing the word and the composite vector generated by the character N-gram vector combining unit 42, and the resultant vector is output by the output unit 16.

As described above, the word coding device of the first embodiment can generate the embedding vector representing the word in consideration of the importance of the character string of the word by calculating the weight for the embedding vector representing each of the character N-grams included in the word, and generating the composite vector obtained by combining the embedding vector representing the character N-gram.

Specifically, the following points can be advantageously taken into consideration.

Among the component elements of a composite word, an important element in a predetermined task can be focused on. For example, in acquisition of a language model for " . . . Company", the part "Company" indicating it is a company is important for predicting the next word. In the embodiment of the present invention, the embedding vector of the word can be configured by putting a weight on that part.

In addition to the above-described composite word, prefixes and suffixes may be taken into consideration.

Second Embodiment

Next, a second embodiment in which the present invention is applied to a language model learning device and an analysis device will be described. Note that parts having the same configuration as those of the first embodiment are denoted by the same reference signs, and descriptions thereof will be omitted.

Figure 5:
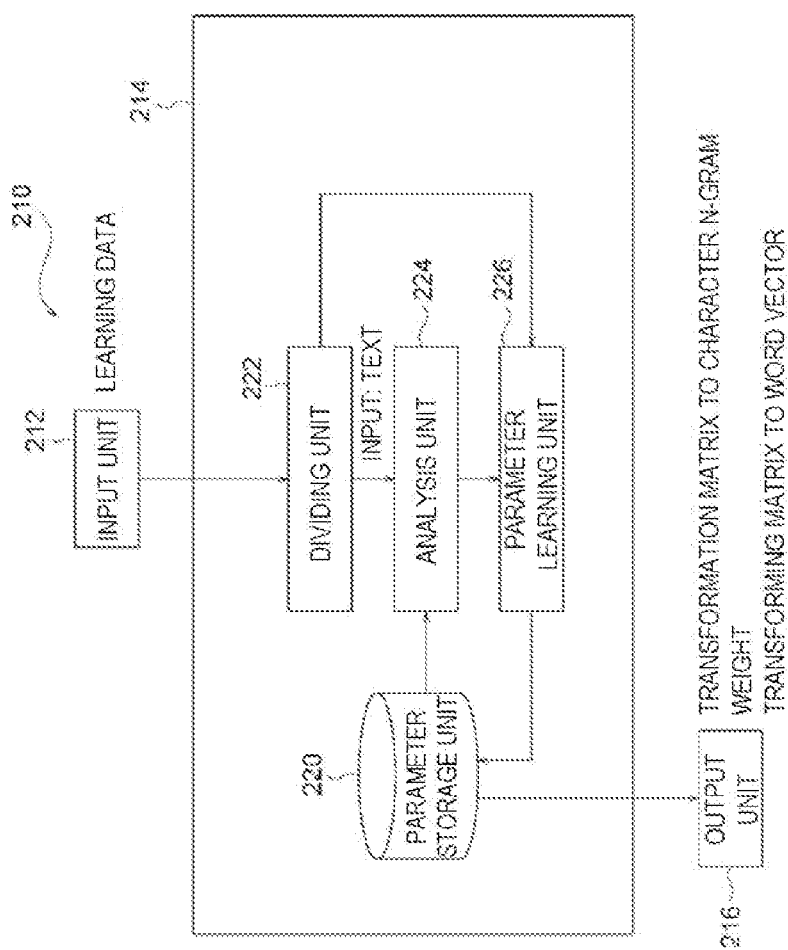
FIG. 5 is a schematic diagram illustrating an example of a configuration of a language model learning device according to a second embodiment.

Configuration of Language Model Learning Device According to Second Embodiment of Present Invention A configuration of a language model learning device according to the second embodiment of the present invention will be described. FIG. 5 is a schematic diagram illustrating a configuration of the language model learning device according to the second embodiment of the present invention.

A language model learning device 210 according to the second embodiment of the present invention includes an input unit 212, a computation unit 214, and an output unit 216.

The input unit 212 accepts a text for learning as learning data D.

The computation unit 214 is composed of a computer including a CPU, a RAM, and a ROM storing a program for executing a language model learning process routine described later, and is functionally configured as follows. The computation unit 214 includes a parameter storage unit 220, a dividing unit 222, an analysis unit 224, and a parameter learning unit 226.

The parameter storage unit 220 stores parameters used in the process of each of the character N-gram vector acquisition unit 30, the character N-gram coding unit 32, the word vector acquisition unit 34, the word vector combining unit 36, a sequence coding unit 232, and a sequence decoding unit 234.

The dividing unit 222 performs a process of dividing a text included in the entered learning data D into an input and an output (teacher signal) to a language model. Specifically, the word included in the text may be set as the input and the next word may be set as the output.

Figure 6:
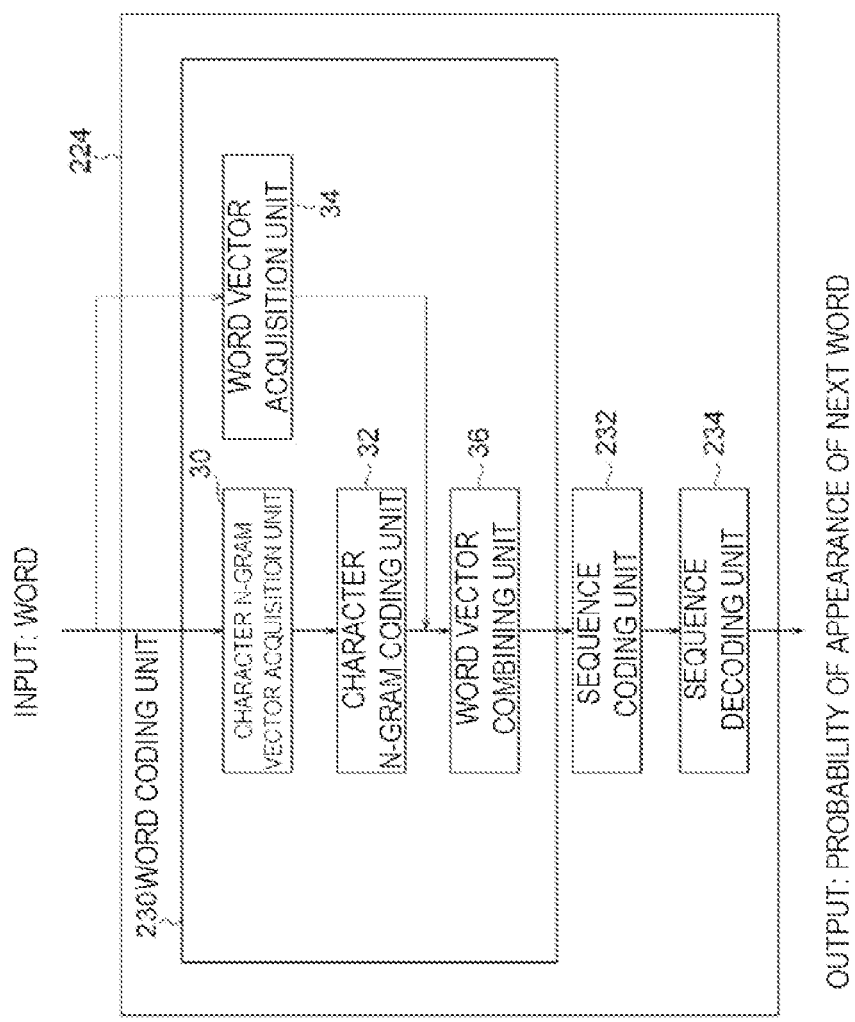
FIG. 6 is a schematic diagram illustrating an example of a configuration of an analysis unit of the language model learning device according to the second embodiment of the present invention.

For each word included in the entered text, the analysis unit 224 outputs a prediction result of the next word of the word by using a pre-learned neural network. As illustrated in FIG. 6, the analysis unit 224 includes a word coding unit 230, a sequence coding unit 232, and the sequence decoding unit 234.

The word coding unit 230 has a configuration similar to that of the word coding unit 22 described in the first embodiment, and generates and outputs a composite word vector representing the character N-gram and the word by using a pre-learned neural network, for an entered word as a coding target. Specifically, the word coding unit 230 includes a character N-gram vector acquisition unit 30, the character N-gram coding unit 32, the word vector acquisition unit 34, and the word vector combining unit 36.

The sequence coding unit 232 calculates, in order from the first word of an entered text, a hidden vector $h_t$ for the t-th word on the basis of a composite word vector $e_t'$ and a hidden vector $h_{t+1}$ calculated for a t-th word.

Specifically, the hidden vector $h_t$ for the t-th word is calculated according to the following equation.

$$h_t = f(e_t', h_{t-1}) \qquad \text{[Math. 5]}$$

Where f represents an abstract function of RNN.

The sequence decoding unit 234 predicts a (t+1)-th word on the basis of the hidden vector $h_t$ calculated by the sequence coding unit 232.

Specifically, a probability vector $P_{t+1}$, which represents a probability of appearance as the (t+1)-th word of each word, is calculated according to the following equation.

$$P_{t+1} = \text{softmax}(Wh_t + b) \qquad \text{[Math. 6]}$$

Where
$$W \in \mathbb{R}^{V \times D_h}$$

is a weight matrix, and $D_h$ is a number of dimensions of the hidden vector. In addition,
$$b \in \mathbb{R}^V$$

is a bias term.

Figure 7:
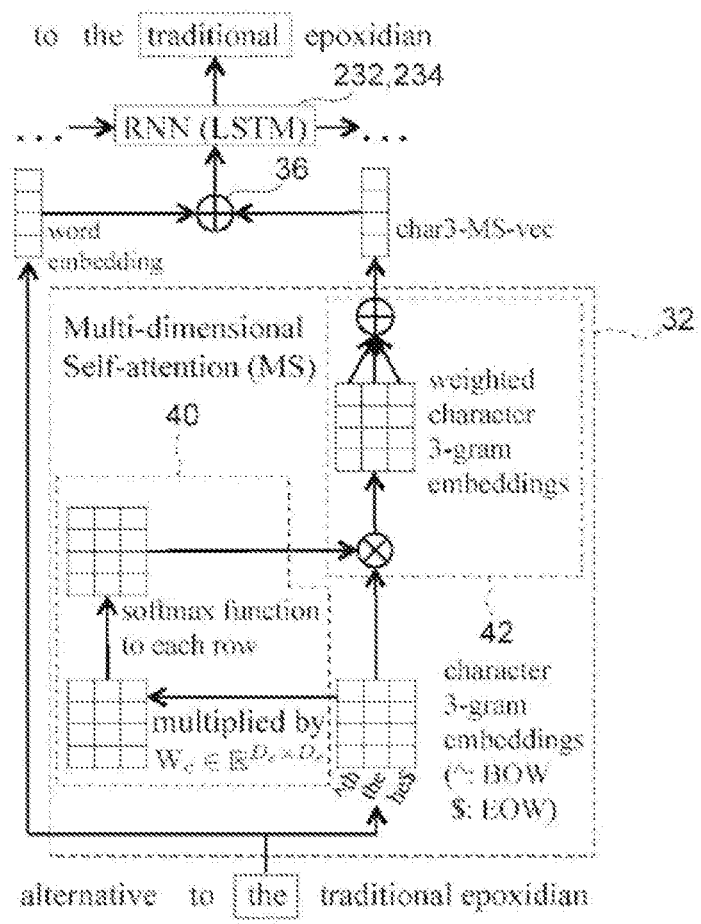
FIG. 7 is a diagram for describing an overview of a process of the analysis unit of the language model learning device according to the second embodiment of the present invention.

The sequence coding unit 232 and the sequence decoding unit 234 are composed of RNN (RNN (LSTM) in FIG. 7), which is a LSTM.

The parameter learning unit 226 learns, for each word of a learning text, the vector representing the character N-gram, the parameter used in calculation of the weight, the vector representing the word, and each parameter of sequence coding unit 232 and the sequence decoding unit 234 on the basis of the prediction result of the next word by the analysis unit 224 and the next word of the actual word in the learning text, and parameter learning unit 226 stores them in the parameter storage unit 220.

Specifically, the learning is performed for each word such that the transformation matrix C to the embedding vector representing the character N-gram, the parameter $W_c$ used in calculation of the weight, the transforming matrix E to the embedding vector representing the word, the parameter of the function f( ) of the sequence coding unit 232, and the parameter W and the gradient of b of the sequence decoding unit 234 are determined, and each parameter is updated, so as to optimize a loss function represented by the calculated probability for a word that actually appears as a next word.

Thus, by learning the RNN language model using the embedding vector of the word composed of the character N-gram, the transformation matrix C, the weight parameter $W_c$ and the transforming matrix E to the word vector, which are parameters of the neural network, are learned at the same time.

Figure 8:
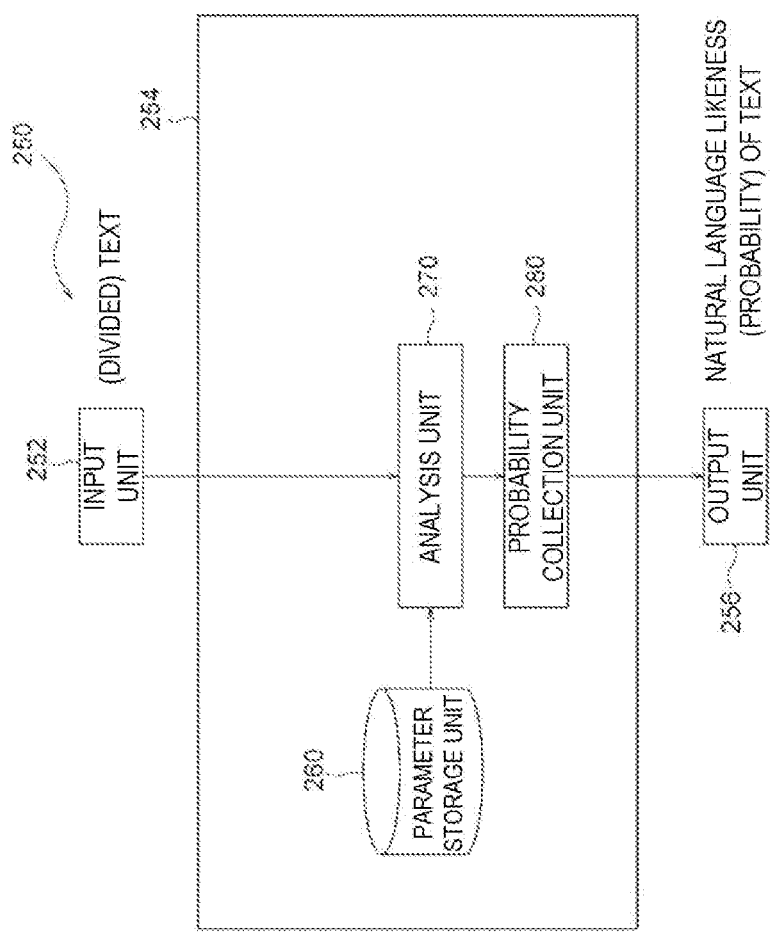
FIG. 8 is a schematic diagram illustrating an example of a configuration of an analysis device according to the second embodiment of the present invention.

Configuration of Analysis Device According to Second Embodiment of Present Invention An analysis device according to the second embodiment of the present invention will be described. FIG. 8 is a schematic diagram illustrating a configuration of the analysis device according to the second embodiment of the present invention.

An analysis device 250 according to the second embodiment of the present invention includes an input unit 252, a computation unit 254, and an output unit 256.

The input unit 252 accepts, as an input, an analysis target text. Assume that the text entered here has already been divided into words.

The computation unit 254 is composed of a computer including a CPU, a RAM, and a ROM storing a program for executing an analysis process routine described later, and is functionally configured as follows. The computation unit 254 includes a parameter storage unit 260, an analysis unit 270, and a probability collection unit 280.

The parameter storage unit 260 stores the parameters used in the process of each of the character N-gram vector acquisition unit 30, the character N-gram coding unit 32, the word vector acquisition unit 34, the word vector combining unit 36, the sequence coding unit 232, and the sequence decoding unit 234, as with the parameter storage unit 220 of the language model learning device 210.

The analysis unit 270 has a configuration similar to that of the analysis unit 224, and includes the word coding unit 230, the sequence coding unit 232, and the sequence decoding unit 234. Specifically, the analysis unit 270 uses a pre-learned neural network to calculate the probability vector $P_{t+1}$, which represents the probability of appearance as a next word, for each word included in the analysis target text.

For each word included in the analysis target text, the probability collection unit 280 sums up the probability of each word that actually appears as the next word, which is output as the probability representing the natural language likeness of the entered text by the output unit 256.

Figure 9:
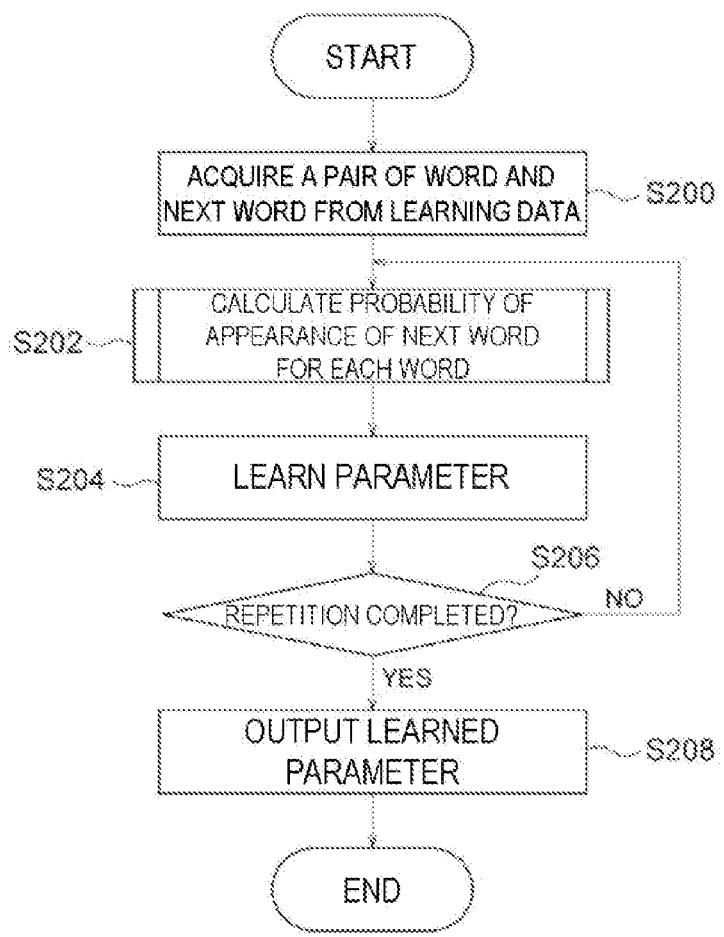
FIG. 9 is a flowchart illustrating a language model learning process routine of the language model learning device according to the second embodiment of the present invention.

Operation of Language Model Learning Device According to Second Embodiment of Present Invention FIG. 9 is a flowchart illustrating a language model learning process routine according to the second embodiment of the present invention.

When learning data is input to the input unit 252, the language model learning process routine illustrated in FIG. 9 is executed in the language model learning device 210.

First, at step S200, the dividing unit 222 performs a process of dividing the text included in the entered learning data into an input and an output (teacher signal) to a language model.

At step S202, for each word of the text included in the learning data as the processing target, the analysis unit 224 calculates a probability vector $P_{t+1}$ representing the probability of appearance as the next word of the processing target word by performing each process of steps S210 to S216 of FIG. 10 described below.

At step S204, the parameter learning unit 226 learns, for each word of learning text, the vector representing the character N-gram, the parameter used in calculation of the weight, the vector representing the word, and each parameter of the sequence coding unit 232 and the sequence decoding unit 234 on the basis of the prediction result of the next word by the step S202 and the next word of the actual word in the learning text, and parameter learning unit 226 stores them in the parameter storage unit 220.

At step S206, whether learning has converged is determined. Specifically, when it is determined that the probability of the actual next word has been sufficiently high, then it is determined that the learning has converged, and the process is transferred to step S208. When it is determined that the probability of the actual next word has not been sufficiently high, then it is determined that the learning has not been converged, and the process is transferred to the step S202.

At step S208, the vector representing the character N-gram, the parameter used in calculation of the weight, the vector representing the word, and the parameters of the sequence coding unit 232 and the sequence decoding unit 234 stored in the parameter storage unit 220 are output by the output unit 216, and the language model learning process routine is terminated.

Figure 10:
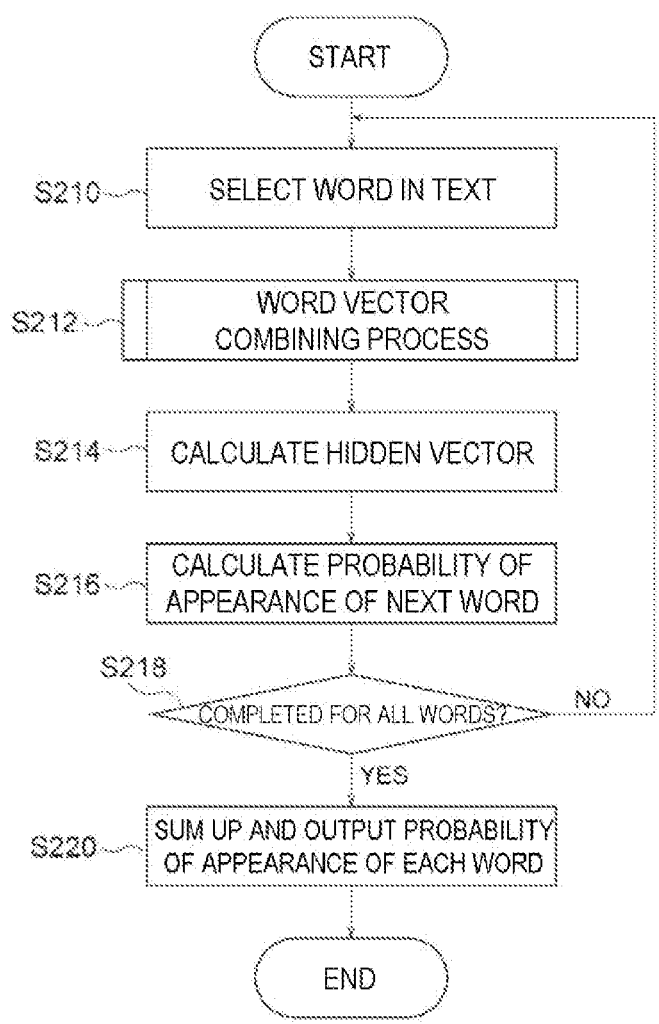
FIG. 10 is a flowchart illustrating an analysis process routine of the analysis device according to the second embodiment of the present invention.

Operation of Analysis Device According to Second Embodiment of Present Invention FIG. 10 is a flowchart illustrating an analysis process routine of the analysis device 250 according to the second embodiment of the present invention.

Various parameters learned by the language model learning device 210 are stored in the parameter storage unit 260 of the analysis device 250. When an analysis target text is entered to the input unit 252, the analysis process routine illustrated in FIG. 10 is executed in the analysis device 250.

First, at step S210, the word in the analysis target text is selected as the processing target word.

At step S212, for the word selected at the step S210 as the coding target, the word coding process routine illustrated in FIG. 4 is executed to generate the composite word vector $e_t'$ representing the character N-gram and the word.

At step S214, the sequence coding unit 232 calculates the hidden vector $h_t$ on the basis of the composite word vector $e_t'$ and the hidden vector $h_{t-1}$ calculated for the previous word.

At step S216, the sequence decoding unit 234 calculates the probability vector $P_{t+1}$ representing the probability of appearance as the next word on the basis of the hidden vector $h_t$ calculated by the sequence coding unit 232.

At step S218, whether the process of the steps S210 to S216 has been performed for all the words in the analysis target text is determined. When there is a word that has not been subjected to the process of the steps S210 to S216, the process is returned to step S210, and the word is selected. On the other hand, when the process of the steps S210 to S216 has been performed for all words in the analysis target text, the process is transferred to step S220.

At step S220, for each word included in the analysis target text, the probability of each word that actually appears as the next word is summed up, and it is output by the output unit 256 as the probability representing the natural language likeness of the entered text, and then, the analysis process routine is terminated.

As described above, the language model learning device according to the present embodiment can learn a language model for accurate analysis of a text by calculating the weight for the embedding vector representing each of the character N-grams included in the word, generating the composite vector obtained by combining the embedding vector representing of each of the character N-grams, and generating the composite word vector combined with the embedding vector representing the word.

In addition, the analysis device according to the present embodiment can analyze the text with high accuracy through prediction of the next word by calculating the weight for the embedding vector representing each of the character N-grams included in the word, generating the composite vector obtained by combining the embedding vector representing each of the character N-grams, further generating the composite word vector combined with the embedding vector representing the word.

Example of Experiment

An experiment was performed to confirm the effectiveness of the method described in the second embodiment. Results of the experiment will be described below.

Method of Experiment

An experiment was conducted on a language model in a word unit. Specifically, with training data, various parameters were learned and whether probability can be correctly given to the test data as natural language likeness is verified. Perplexity, which is the evaluation index, is the Napier's constant to the negative log-likelihood of each word, and the lower the better.

Data Set

As a standard benchmark dataset, Penn Treebank (PTB) was used for word-level language modeling. For the character N-gram, N=3 was used.

Comparative Techniques

As comparative examples, the technique of NPL 1 (Character-Word LSTM) was used, and the technique of NPL 2 (AWD-LSTM) was used as the baseline technique.

NPL 2: Stephen Merity, Nitish Shirish Keskar, and Richard Socher. 2018b. Regularizing and Optimizing LSTM Language Models. In Proceedings of the 6th International Conference on Learning Representations (ICLR 2018).

Summary of Techniques

The technique of NPL 2 (AWD-LSTM) is a three-layer LSTM language model using an embedding vector in a word unit. The technique of NPL 1 (Character-Word LSTM) is a language model using an embedding vector of characters constituting a word.

The proposed technique described in the second embodiment is a technique in which the character N-gram vector acquisition unit 30, the character N-gram coding unit 32, and the word vector combining unit 36 in FIG. 1 are added to the baseline technique.

Conclusions

Results of the experiment for each technique are shown in Table 1. In the proposed method described in the second embodiment (see proposed method: AWD-LSTM+char3-MS-vec), the weighting of the character N-gram improved the performance from the baseline, and further, achieved a performance higher than that of the technique of NPL 1 (Character-Word LSTM).

TABLE 1

| Model | # Params | Valid | Test |
|---|---|---|---|
| Character-Word LSTM (Verwimp et al., 2017) | — | — | 82.04 |
| AWD-LSTM (Merity et al., 2018b) | 24M | 60.0 | 57.3 |
| Proposed method: AWD-LSTM + char3-MS-vec | 26M | 57.40 | 55.56 |

Note that the present invention is not limited to the above-described embodiments, and various modifications and applications may be made without departing from the gist of the present invention.

For example, while an exemplary case is described in the embodiments in which the embedding vector combined for the character N-gram and the embedding vector of the word are combined, the present invention is not limited thereto. In the embodiments, it is also possible to adopt a configuration in which an embedding vector combined for a character N-gram is output as a vector representing a word without combining it with the embedding vector of the word. In this case, it is possible to adopt a configuration in which the word vector combining unit 36 is omitted and the embedding vector $c_t$ combined for the character N-gram is output as the vector $e_t'$ representing the word.

In addition, while an exemplary case is described in the second embodiment in which parameters of the RNN language model are learned and natural language likeness is calculated by predicting the next word for each word of a given text by the analysis unit, the present invention is not limited thereto. It suffices that the analysis unit is configured to output a prediction result of an output text for a predetermined purpose for the input text using a pre-learned neural network. For example, as a prediction result of an output text for a predetermined purpose, a translated text or a summed text may be output for an entered text. In addition, in this case, the analysis unit may include an encoder/decoder using a neural network, and an embedding vector as an input of the encoder or decoder may be generated using the techniques described in the embodiments of the present invention.

In addition, while the program is installed in advance in the embodiments in the specification, it is also possible to provide the program stored in a computer-readable recording medium.

REFERENCE SIGNS LIST

10 Word coding device
12, 212, 252 Input unit
14, 214, 254 Computation unit
16, 216, 256 Output unit
20 Parameter storage unit
22 Word coding unit
30 Character N-gram vector acquisition unit
32 Character N-gram coding unit
34 Word vector acquisition unit
36 Word vector combining unit
40 Weight calculation unit
42 Character N-gram vector combining unit
210 Language model learning device
220, 260 Parameter storage unit
222 Dividing unit
224, 270 Analysis unit
226 Parameter learning unit
230 Word coding unit
232 Sequence coding unit
234 Sequence decoding unit
250 Analysis device
280 Probability collection unit

The invention claimed is:

1. A word coding device comprising a processor configured to execute operations comprising:
converting an entered word into a word vector by using a pre-learned neural network, wherein the entered word includes character N-grams, wherein the pre-learned neural network generates the word vector of the entered word;

acquiring a predetermined vector of each of the character N-grams included in the entered word;

calculating a weight for the predetermined vector of each of the character N-grams on a basis of the predetermined vector of each of the character N-grams included in the entered word;

generating a composite vector obtained by combining the predetermined vector of each of the character N-grams on a basis of the predetermined vector of each of the character N-grams included in the entered word and the weight for the predetermined vector of each of the character N-grams;

generating, based on the word vector and the composite vector, a composite word vector; and transmitting the composite word vector to an application, wherein the application is configured to perform, based on the composite word vector, machine generation of another word and eliminating one or more less-weighted candidate word from the composite word vector.

2. The word coding device according to claim 1, the processor further configured to execute operations comprising:
receiving a text, wherein the text includes the received words.

3. The word coding device according to claim 1, wherein the converting further comprises using a recurrent neural network, and the recurrent neural network converts the entered word into the composite vector.

4. The word coding device according to claim 1, wherein the converting further comprises using a learned recurrent neural network language model using the character N-gram vector.

5. The word coding device according to claim 1, wherein the weight is associated with each dimension of the character N-gram vector.

6. The word coding device according to claim 1, wherein the entered word represents a prefix of a word.

7. The word coding device according to claim 1, wherein the entered word represents a suffix of a word.

8. An analysis device comprising a processor configured to execute operations comprising:
converting each word included in entered text into a composite word vector, wherein the entered text includes words;

calculating, in order from a first word of the entered text, a hidden vector for at-th word by using a hidden vector calculated for a (t-1)th word and a composite word vector output for the t-th word from the word coding unit;

generating a prediction result of the output text from the hidden vector calculated for each word included in the entered text, wherein each word includes character N-grams;

acquiring, for each word included in the entered text, a vector representing each of the character N-grams included in the word;

calculating a weight for a predetermined vector representing each of the character N-grams on a basis of the predetermined vector representing each of the character N-grams included in the word;

generating a composite vector obtained by combining the predetermined vector of each of the character N-grams on a basis of the predetermined vector of each of the character N-grams included in the word and the weight for the predetermined vector representing each of the character N-grams;

acquiring a vector representing the word; and generating and transmitting a composite word vector obtained by combining the vector representing the word and the composite vector generated by combining the predetermined vector of each of the character N-grams and eliminating one or more less-weighted candidate word from the composite word vector.

9. The analysis device according to claim 8, the processor further configured to execute operations comprising:
learning a predetermined vector representing the character N-grams, a parameter used in calculation of the weight, and a vector representing the word on a basis of the prediction result of the output text.

10. The analysis device according to claim 8, the processor further configured to execute operations comprising:
receiving a text, wherein the text includes the entered words.

11. The analysis device according to claim 8, wherein the converting further comprises using a recurrent neural network.

12. The analysis device according to claim 8, wherein the converting further comprises using a learned recurrent neural network language model using the character N-gram vector, and the learned recurrent neural network converts the entered word into the composite vector.

13. The analysis device according to claim 8, wherein the entered word represents a prefix of a word.

14. The analysis device according to claim 8, wherein the entered word represents a suffix of a word.

15. A word coding method, the method comprising:
converting an entered word into a word vector by using a pre-learned neural network, wherein the entered word includes character N grams, wherein the pre-learned neural network generates the word vector of the entered word;

acquiring a predetermined vector of each of the character N-grams included in a word;

determining a weight for a vector of each of the character N-grams on a basis of the predetermined vector of each of the character N-grams included in the entered word;

generating a composite vector obtained by combining the predetermined vector of each of the character N-grams on a basis of the predetermined vector of each of the character N-grams included in the word and the weight for the predetermined vector of each of the character N-grams;

generating, based on the word vector and the composite vector, a composite word vector; and transmitting the word composite vector to an application, wherein the application is configured to perform, based on the composite word vector, machine generation of another word and eliminating one or more less-weighted candidate word from the composite word vector.

16. The word coding method according to claim 15, the method further comprising:
receiving a text, wherein the text includes the entered words.

17. The word coding method according to claim 15, wherein the converting further comprises using a recurrent neural network to convert the entered word into the composite vector.

18. The word coding method according to claim 15, wherein the converting further comprises using a learned recurrent neural network language model using the character N-gram vector.

19. The word coding method according to claim 15, wherein the entered word represents a prefix of a word.

20. The word coding method according to claim 15, wherein the entered word represents a suffix of a word.

* * * * *